Figure 1:
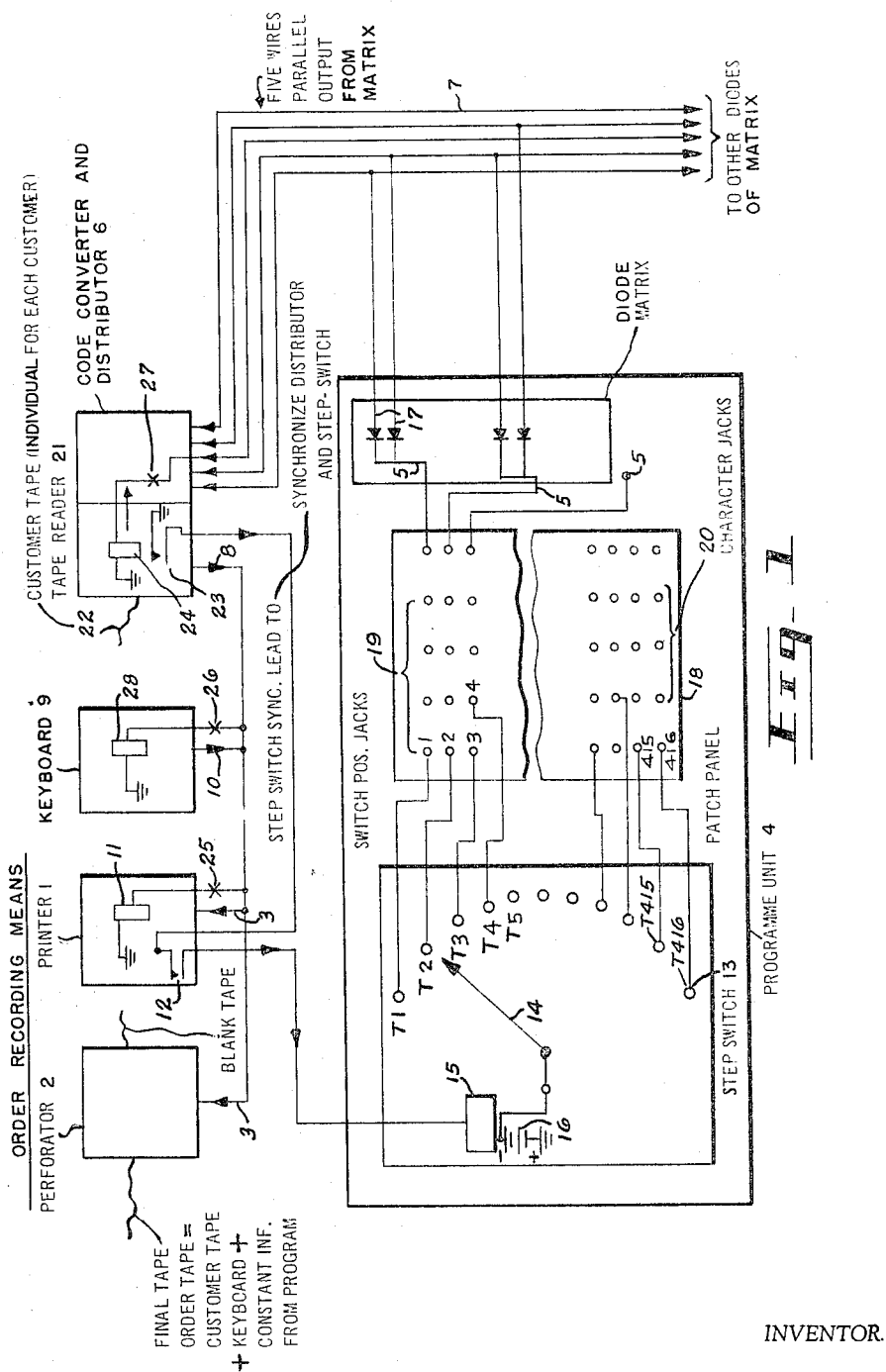

INVENTOR.
D. N. HUTCHINSON

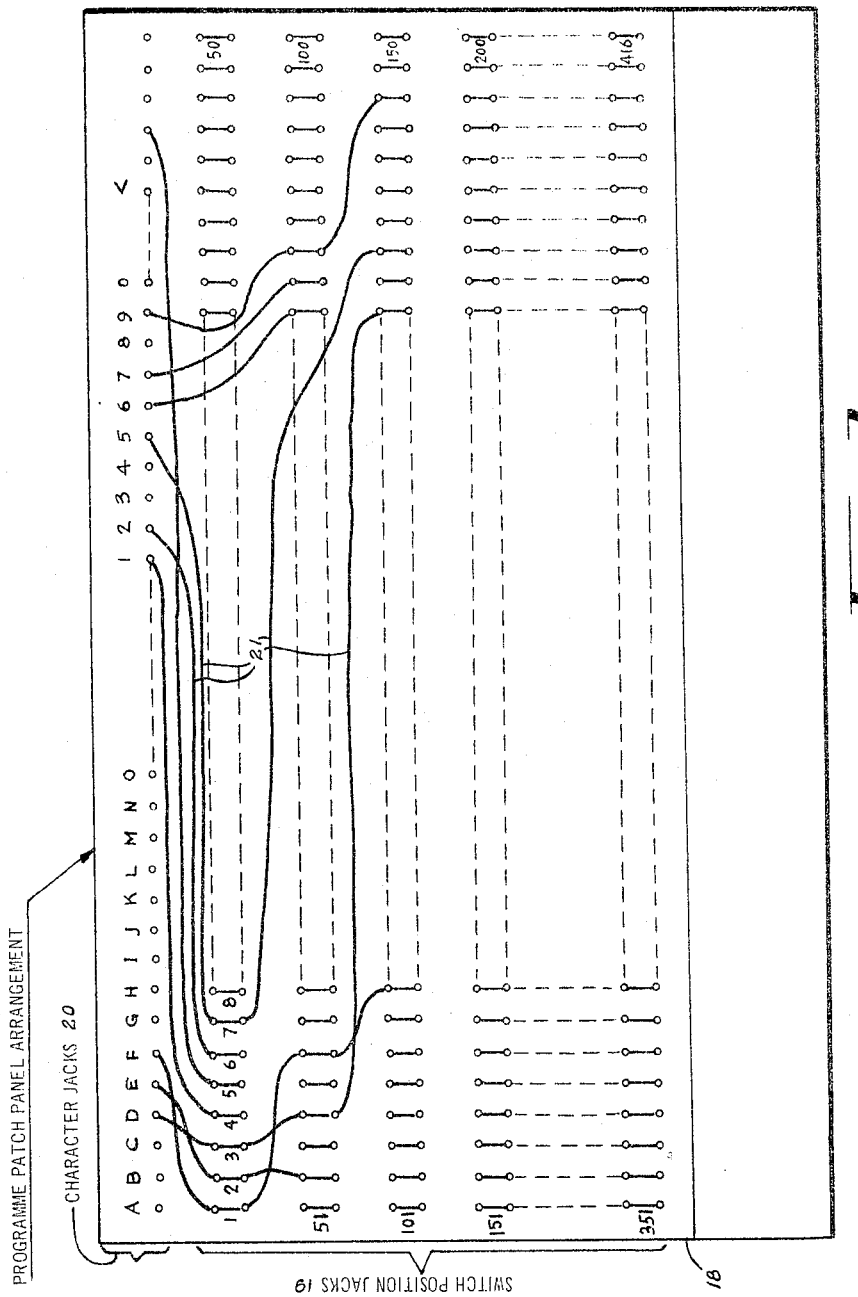

United States Patent Office 3,281,526
Patented Oct. 25, 1966

3,281,526
TELEPRINTER ORDER WRITING SYSTEM
David Norman Hutchinson, Dorval, Quebec, Canada, assignor to The Bell Telephone Company of Canada, Montreal, Quebec, Canada, a corporation of Canada
Filed Oct. 26, 1962, Ser. No. 233,315
4 Claims. (Cl. 178—2)

This invention relates to data processing system and more particularly to order writing teleprinting transmitting systems.

Teleprinter order writing systems usually involve the generation of constant and variable information which is recorded on a teleprinter tape. The constant information consists of programme control signals to control the programming of the receiving teleprinter apparatus at the customer's station, with respect to the lay-out of the information presented thereat and, in addition the "stunts" for setting the teleprinter, such as carriage return, spacing, feed and the address codes. The variable information consists of data relating to the order. The usual method for including the above indicated information on a tape is to make a tape to include all the information peculiar to a predetermined customer. This resulted in long, inconvenient, tapes, especially since the constant information programming signals had to be repeated for each customer in addition to the variable information peculiar to that customer. In addition, if a tape contained an error it had to be remade, which is expensive and, if not corrected, led to considerable difficulties.

An object of this invention is to provide a teleprinter order writing system employing a customer tape having the minimum amount of information included thereon.

A further object of this invention is to provide a teleprinter order writing system having the foregoing properties in which the liability of errors is reduced.

My invention is an order preparation system comprising order recording means, fixed order information generating means, code converting and distributing means, and variable order information generating means connected so that fixed information relating to a plurality of orders is generated in the fixed order information generating means, is translated by the code converter into a form acceptable by the order recording means and transmitted thereto by the distributor, and is recorded by the order recording means to produce a final order.

The operation of the order recording means serves to cause the fixed order information generating means to generate another piece of information which is to be recorded. If the piece of fixed information generated by the fixed order information generating means is a "stop" or blank character, the order recording means will not operate, stopping the generation of new pieces of fixed order information. At that point, variable order information generating means, which may be a keyboard, can generate pieces of information which may be recorded by the order recording means. The fixed order information generating means thus may be programmed so that when it is desired that pieces of variable information are to be recorded by the order recording means, the fixed order information generating means generates "blank" or no information.

Thus, it may be seen that the final order may consist of the combination of fixed and variable information. The generation of this information will operate in an automatic manner with the fixed information being constant for a plurality of orders, and the variable information being different for each order, inserted in the proper order form places. This may be done conveniently by an operator, watching the production of an order on a type printer, inserting the proper variable information by means of the keyboard whenever the equipment stops at a programmed spot as described above.

In addition, in another embodiment of my invention, semi-fixed information such as a customer's name, address, etc., may be inserted automatically into a particular order. The semi-fixed information generator, which may be a punched card or punched tape reader, is operated by means of a predetermined code designation generated in the fixed order information generating means. The semi-fixed order information generator fulfills an equivalent function to the variable order information generating means except that the semi-fixed order information is predetermined on the aforementioned punched cards or tape. In this manner, the punched tape has a minimum amount of information, the invariant information is automatically produced, and the information generated through the use of an operator is kept to a minimum. Therefore, the liability of errors is substantially reduced.

A better understanding may be had by referring to the following description taken in conjunction with the drawings, FIGS. 1 and 2, in which:

FIG. 1 illustrates a schematic diagram in partial block form, of the teleprinter order writing system, showing the elements required to describe the invention, and FIG. 2 illustrates a programme patch panel with sample patchcord connections.

FIG. 1 shows the combination of two of the embodiments of my invention. The first embodiment comprises order recording means shown as printer 1, and perforator 2 as an auxiliary or main piece of order recording equipment. The order recording means has a signal input circuit 3.

Also, fixed order information generating means is shown as program unit 4 having an output circuit shown as terminals 5. Code converter and distributor 6 has a code input circuit 7 connected to the output circuit 5 of the fixed order information generating means, and also has a signal output circuit 8 connected to the input circuit 3 of the order recording means.

Variable order recording means shown as keyboard 9 has an output circuit 10 also connected to the signal input circuit of the order recording means. The signal output circuit 8 of the code converter and distributor 6 and the output circuit 10 of the keyboard 9 are both connected to the input circuit 3 of the order recording means in a well known manner.

My fixed order information generating means is responsive to the operation of the order recording means. This embodiment of my invention utilizes a line relay 11 in the printer 1 with a first contact 12 which closes each time the line relay operates. The line relay is connected to the printer so that it operates every time a pulse of information is received. An energizing circuit through the first contact 12 is connected to the fixed order information generating means in such a way as to cause the generation of another piece of fixed information.

The fixed order information generating means, shown as program unit 4, has within it means for sequentially contacting a plurality of terminals. This is shown in FIG. 1 as step switch 13 (which may, in fact, be a number of step switches connected in bank configuration) having a plurality of terminals T1 to T416, slider 14 which contacts each of the plurality of terminals in sequential order, and electromagnet 15 which actuates the slider 14. An energization circuit, comprising first contact 12 and energizing means such as battery 16, is connected to electromagnet 15 of the step switch 13. Therefore, whenever contact 12 closes due to the operation of line relay 11, the step switch electromagnet 15 is caused to operate, stepping slider 14 from one to the next of the plurality of terminals. Each of the plurality of terminals T1 to T416 may be connected to a fixed order information generating means output circuit terminal 5. In the embodiment, battery 16 is connected to the slider 14. Therefore, when the slider contacts a particular one of the plurality of terminals of the step switch 13 a particular output terminal 5 is connected to the battery 16.

The code converter and distributor 6 has a five level code input circuit in this case. It may, however, have another type of code input circuit. In this case, a battery applied to various combinations of the code input circuit terminals causes the code converter and distributor 6 to translate the code combination and send a pulse of order information, in a form recognizable by the order recording means, through its output circuit 8 to the input circuit 3 of the printer 1 and/or perforator 2. Therefore, each output circuit terminal 5 of the fixed order generating means is connected to particular terminals of the code input circuit 7 of the code converter and distributor 6 in order to generate particular characters of order information.

However, it may be seen that if one of the output circuit terminals of the fixed order information generating means is connected to, say, the first and second terminal of the code input circuit 7, and another output circuit terminal 5 is connected to the first and third terminal of the code input circuit 7, a short circuit will occur from the second, to the first, to the third code input circuit terminal. Therefore, to eliminate this possibility, diodes 17 are connected in the conductors leading from each output circuit terminal 5, to the aforementioned designated code input circuit terminals.

Referring now to FIG. 2 of the drawings, means is shown for connecting the plurality of terminals of the step switch 13 to the output circuit terminals 5 of the program unit. The means preferred is a program patch panel. Thus more than one of the plurality of terminals may be connected to a particular output circuit terminal. The program patch panel 18 has switch position jacks 19 which are intended to correspond and be connected to each of the plurality of terminals T1 to T416 of the step switch 13. One column of the patch panel 18 has character jacks 20, which can conveniently be labeled numerically, alphabetically, and/or functionally. Each of the character jacks 20 are connected to one of the output terminals 5 of the program unit 4. By means of the sample arrangement of conductors 21 shown, it may be seen that any switch position jack 19 may be connected to any character jack 20. Therefore, when one of the plurality of terminals T1 to T416 of the step switch 13 is contacted by the slider 14, a predetermined output terminal 5 is energized, in turn energizing a particular number and configuration of code input circuit terminals 7 to generate a particular piece of code information.

Referring back to FIG. 1, another embodiment of my invention is the combination of the above-described embodiment including semi-fixed order information generating means. This may be a punched card or tape reader, shown as a tape reader 21 in the drawing. In operation, a tape 22 individual to each customer is fed into the tape reader. The tape reader is connected by well known means to the code converter and distributor, and operates in response to a particular code received by the code converter and distributor 6. The semi-fixed order information fed from the customer tape 22 is then fed to the output circuit 8 of the code converter and distributor 6 by well known means.

According to my invention, a second contact 23 is associated with the clutch magnet 24 of the tape reader 21. The clutch magnet operates in a well known manner when the tape reader is reading the customer tape 22. Therefore, the second contact is operated by the operation of the clutch magnet.

According to my invention the second contact may be a make contact connected in series with the first make contact 12 of the printer 1.

Make contacts 25, 26, and 27 associated with the variable order generating means allows operation of line relay 11 and clutch magnet 24 whenever a piece of variable information is generated. This may conveniently be effected by means of a switch having contact 26 allowing energization of a relay coil 28, which has make contacts 25 and 27. Thus the operation of a key on the keyboard 9 closes contact 26 which allows energization of relay 28. The operation of relay coil 28 closes contacts 25 and 27 so as to allow energization of line relay 11 and clutch magnet 25. Therefore, contacts 12 and 23 close, operating step switch 13.

It will be readily apparent to one understanding my invention that the second contact can instead be (a) a make contact, connected in parallel with the first make contact 12 of the printer 1, or (b) a break contact in series with the first make contact 12 of the printer 1. In the first case, the fixed order information generating means will be actuated by the tape reader even if the information generated by the tape reader does not include information to be printed. Therefore, the fixed order information generating means will be energized by the operation of the printer 1 or the tape reader 21.

In the second case, it may be seen that whenever the printer 1 line relay 11 operates, contacts 12 will close, energizing step switch 13. However, when the tape reader 21 operates, break contacts 23 will open the circuit leading to the electromagnet 15 of step switch 13 not allowing it to operate even when line relay 11 operates. Thus, the contents of the tape 22 may be read and recorded by the order recording means while step switch slider 14 does not advance. The last piece of information on the customer tape may be one which causes the printer to operate a short interval of time after the tape reader clutch magnet has released. Therefore, contacts 12 of line relay 11 will be closed during an interval of time when the break contacts 23 of clutch magnet 24 are closed, serving to energize electromagnet 15 of the step switch 13, thus advancing the slider 14.

The operation of my invention is as follows. Let us assume that the step switch slider 14 is contacting the first of the plurality of terminals T1, which is not patched to any output terminal 5. Therefore, the device is at rest. Now let an operator at the keyboard 9 depress the space bar thereon. The printer 1 will therefore mark a space on its order form and/or the perforator will punch a space code. Since the line relay 11 in the printer 1 is operated in response to the sending of a space pulse to the printer, contact 12 will close, energizing the electromagnet 15 of step switch 13, causing the slider to move to terminal T2. The contacting of terminal T2 by slider 14 being connected to battery 16 causes battery to be connected to the output terminal 5 to which T2 is connected. The output terminal 5 to which T2 has been connected is, say, connected via certain of the diodes 17 in the diode matrix to terminals of the code input circuit 7 of the code converter and distributor 6 corresponding to the letter "N." Therefore, battery will be applied to those terminals.

The code converter and distributor 6 then translates the code into a form acceptable by the order recording means which, after receiving the signal from the code converter and distributor, prints and/or punches "N." This causes the line relay 11 to operate in the printer 1, which then causes the step switch slider to contact terminal T3. T3 is connected, say, to the output circuit terminal 5 which is connected to the terminals of the code input circuit 7 corresponding to the latter "A." In this way, the fixed order generating means can be made to generate the fixed order information corresponding to "N A M E" "space" and "start-tape-reader." The code converter and distributor 6 interprets, in a well known manner, this signal to one which causes the tape reader to begin reading. The tape reader then reads, say, the name "JOHN DOE stop." The "stop" signal causes the order recording means, after recording the name, to space while the tape reader is stopped. This causes the slider 14 of the step switch to contact the next terminal which, say, is a space mark. After another space mark the slider contacts a terminal to which nothing is connected. Therefore, further operation is halted. At this point, an operator at the keyboard 9 can type "$6.21." The last figure entered by the keyboard 9 can cause the slider of the step switch to contact a terminal which begins the generation of further fixed order information. In this manner, the combination of fixed, semi-fixed and variable information may be recorded on an order.

It may be seen that my invention makes possible a large reduction of operator labour, decreases the possibility of errors, and allows the generation of a complete final order by semi-automatic means. Commonly, the order recording means, perforator, printer, and keyboard may be found in a well known teletype network. Thus, the generation of orders on such a teletype system may be easier, more accurate, and more uniform than previously, with less time and material wastage due to errors.

What is claimed is:

1. An order preparation system comprising:
    (a) fixed order information generating means comprising actuating means, stepping means operated by said actuating means for sequentially contacting a first plurality of terminals whereby coded characters of information or commands are generated, and an output circuit having a second plurality of output terminals each corresponding to a character of coded information or an operation command,
    (b) order recording means comprising a line relay responsive to the reception of a coded character, having a first contact means connected to said actuating means,
    (c) semi-fixed order information generating means comprising a clutch magnet actuated through the reception of a code command and a second contact means operated thereby,
    (d) said second contact means being connected to the first contact means and said actuating means such that when the first contact means is operated, the actuating means is operated, but when the first and second contact means are operated, the actuating means is not operated,
    (e) variable order information generating means connected to the order recording means having keys corresponding to individual characters, comprising a switch operable when a key is depressed to operate the actuating means,
    (f) code converting and distributing means connected to the semi-fixed order information generating means and to said output terminals of the fixed order information generating means, having an output circuit connected to the order recording means, whereby when a character of coded fixed or semi-fixed order information is generated, the order recording means is caused to operate.

2. An order preparation system as defined in claim 1 wherein:
    (a) the fixed order information generating means comprises a stepping switch having an electromagnet actuating means and patching means for changeably interconnecting the first plurality of terminals to said output terminals in order that words of coded characters or commands may be generated,
    (b) the first contact means comprises a make contact,
    (c) said second contact means comprises a break contact with one terminal connected in series with the first contact means and a first terminal of said electromagnet, and
    (d) further comprising a battery having one terminal connected to the stepping means and to a second terminal of the said electromagnet, and having its other terminal connected to a second terminal of the second contact means,
    (e) said switch of the variable order generating means being connected to the line relay of the order recording means, said switch operating the line relay, thus closing the first contact and operating said electromagnet when said second contact is not operated by the clutch magnet, the second contact opening the circuit operation path for the electromagnet when the clutch magnet is operated.

3. An order preparation system comprising
    (a) fixed order information generating means comprising a step switch having an electromagnet, a plurality of contacts and a contacting arm which is caused to touch each contact sequentially as the electromagnet pulsed; a panel with a multiplicity of switch position jacks and character output jacks, connecting wires to which plugs may be attached at each end interconnecting said output jacks with said switch position jacks, each of said contacts being connected to at least one of said switch position jacks,
    (b) printer order recording means comprising a line relay which operates when a coded information or an operation command is received, having a first make contact one terminal of which is connected to one terminal of the stepping switch electromagnet,
    (c) a punched tape reader comprising a clutch magnet actuated by the reception of a coded command generated by the fixed order information generating means, and a second break contact operated thereby, one terminal of said second contact being connected to the second terminal of the first contact, and the other terminal connected to ground,
    (d) a teletypewriter keyboard connected to the printer comprising a switch which closes when a key is depressed, connected to and operating the line relay of said order recording means and
    (e) a code converter and distributor connected to the punched tape reader, and connected through a diode isolation and code conversion matrix to the character output jacks, and having its output circuit connected to the order recording means, and
    (f) a battery having one terminal connected to ground and its other terminal to the contacting arm and the the second terminal of the stepping switch electromagnet.

4. An order preparation system comprising:
    (a) fixed order information generating means comprising stepping means for sequentially contacting a multiplicity of contacts, whereby coded control commands and order characters are generated,
    (b) order recording means connected to the stepping means comprising means for advancing said stepping means at the reception of a character of said order,
    (c) variable order information generating means having a first output connected to the order recording means for generating variable order characters,
    (d) semi-variable order information generating means for generating semi-variable order characters,
    (e) code converting means having an input connected to the output of the fixed order information generating means, an output to the order recording means, and being connected to the semi-variable order information generating means, for converting coded information from the fixed order information generating means into control instructions for the order recording means and the semi-variable order information generating means, and semi-variable order information for the order recording means,
    (f) the fixed order information generating means under the control of the order recording means automatically and continuously generating fixed order characters and control information for the semi-variable order information generating means and the order recording means.

References Cited by the Examiner

UNITED STATES PATENTS

| | | | |
|---|---|---|---|
| 1,971,686 | 8/1934 | Kinkead | 178—17.5 |
| 2,339,293 | 1/1944 | Reiber | 178—17 |
| 2,357,297 | 9/1944 | Wack et al. | 178—2 |
| 2,690,474 | 9/1954 | Edgar | 178—17.5 |
| 2,770,304 | 11/1956 | Tholstrup | 178—17.5 |
| 2,980,758 | 4/1961 | Goldwater et al. | 178—2 |

THOMAS B. HABECKER, *Acting Primary Examiner.*

ROBERT H. ROSE, NEIL C. READ, *Examiners.*

A. J. DUNN, T. A. ROBINSON, *Assistant Examiners.*